United States Patent [19]
Laue

[11] Patent Number: 5,425,286
[45] Date of Patent: Jun. 20, 1995

[54] TWO PIECE PEDAL ROD AND METHOD OF MAKING SAME

[76] Inventor: Charles E. Laue, 1041 Pawnee Rd., Wilmette, Ill. 60091

[21] Appl. No.: 177,952

[22] Filed: Jan. 6, 1994

Related U.S. Application Data

[63] Continuation-in-part of Ser. No. 45,654, Apr. 9, 1993.

[51] Int. Cl.⁶ ............................................. G05G 1/00
[52] U.S. Cl. ............................................. 74/560; 74/586; 74/587; 74/579 R; 403/343; 29/428; 72/377
[58] Field of Search ............... 74/586, 587, 579 R, 74/522, 594; 29/428; 72/377; 403/320, 343

[56] References Cited

U.S. PATENT DOCUMENTS

| 1,196,524 | 8/1916 | Cluett | 74/586 X |
|---|---|---|---|
| 2,701,733 | 2/1955 | Frevik et al. | 74/586 X |
| 3,274,671 | 9/1966 | Hauer et al. | 29/157 |
| 3,496,800 | 2/1970 | Brezinski | 74/586 |
| 3,623,442 | 11/1971 | Willis | 113/121 A |
| 3,762,042 | 10/1973 | Abe et al. | 29/598 |
| 3,786,695 | 1/1974 | Barett | 74/586 |
| 4,012,967 | 3/1977 | Warren | 74/586 |
| 4,146,340 | 3/1979 | Smith | 74/586 X |
| 4,218,156 | 8/1980 | Logan | 403/320 |
| 4,295,389 | 10/1981 | Geisthoff et al. | 74/586 |
| 4,317,355 | 3/1982 | Hatsuno et al. | 72/342 |
| 4,399,682 | 8/1983 | Hackett | 72/359 |
| 4,497,866 | 2/1985 | Petterson et al. | 403/343 |
| 4,602,892 | 7/1986 | Brookstein et al. | 74/502.5 X |
| 4,667,530 | 5/1987 | Mettler et al. | 74/586 X |
| 4,684,284 | 8/1987 | Bradley | 403/320 |
| 4,700,446 | 10/1987 | Schmid et al. | 29/159.2 |
| 4,714,262 | 12/1987 | Wood | 74/586 X |
| 4,787,771 | 11/1988 | Allen | 403/343 X |
| 4,901,426 | 2/1990 | Laue | 29/510 |
| 4,953,894 | 9/1990 | Broszat et al. | 74/522 X |
| 4,967,584 | 11/1990 | Sato et al. | 72/356 |
| 4,970,887 | 11/1990 | Lorieux | 72/356 |
| 4,993,864 | 2/1991 | Gjertsen et al. | 403/343 |
| 5,026,254 | 6/1991 | Ford et al. | 74/586 X |

FOREIGN PATENT DOCUMENTS

| 937424 | 11/1973 | Canada | 74/586 |
|---|---|---|---|
| 352360 | 7/1931 | United Kingdom | 403/343 |

Primary Examiner—Vinh T. Luong
Attorney, Agent, or Firm—Hill, Steadman & Simpson

[57] ABSTRACT

A pedal rod is made of two separate pieces, a rod part and a head part, joined together by a crimped joint having as many as six elements. The parts may be selectively plated and/or coated to provide environmental resistance or color coding.

7 Claims, 1 Drawing Sheet

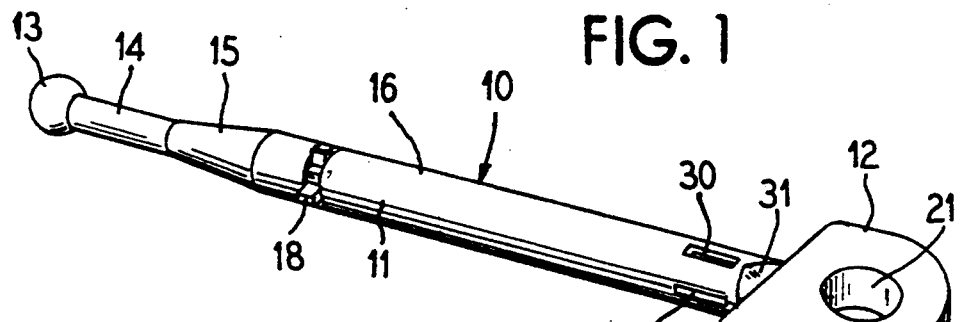
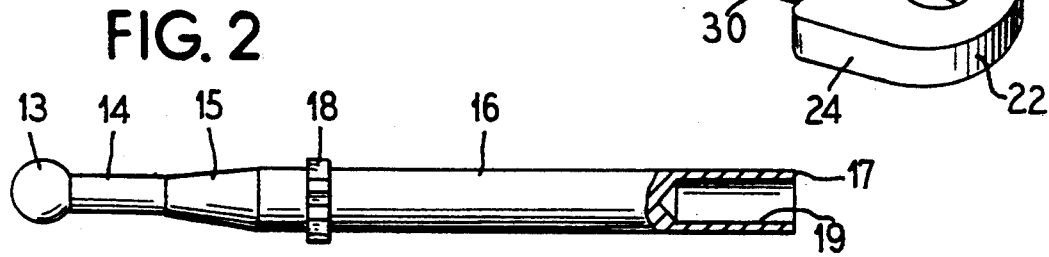
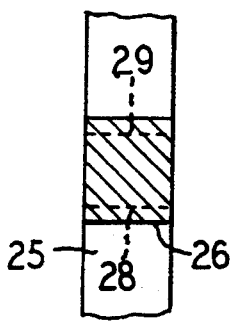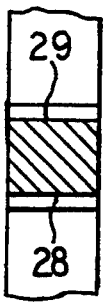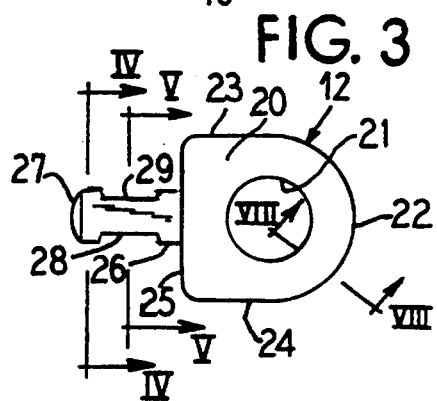
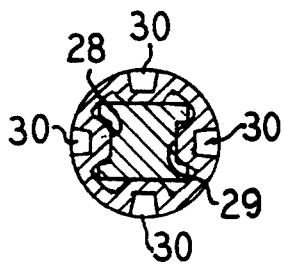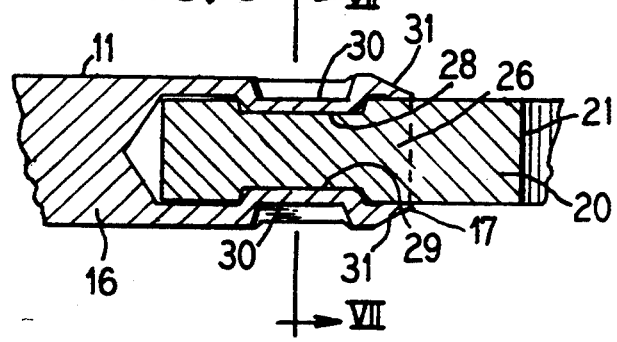

TWO PIECE PEDAL ROD AND METHOD OF MAKING SAME

RELATED APPLICATION

This application is a continuation-in-part of my co-pending application Ser. No. 08/045,654 filed Apr. 9, 1993 entitled "Adjustable Pedal Rod and Method of Making Same."

BACKGROUND OF THE INVENTION

1. Field of the Invention

This invention relates specifically to a pedal rod of the type utilized in the vehicular vehicle industry and wherein devices are actuated by an operator exerting force via a rod-like instrumentality interconnecting a foot or hand operated member and the operating mechanism of a vehicle such as the braking system of a car or truck.

2. The Prior Art

In my prior U.S. Pat. No. 4,901,426, I have disclosed and claimed the methods and equipment for forming threads or thread segments by pressing and without rotation in a pedal rod construction.

In my prior patent issuing on co-pending allowed application Ser. No. 07/833,665, now issued as U.S. Pat. No. 5,230,134, I have disclosed how the respective threaded portions of a mechanical joint may be formed in such a manner as to be matched or intentionally mismatched to afford a selective locking effect as two threadedly related parts are joined together.

In my parent application, of which the present disclosure is a continuation-in-part, Ser. No. 08/045,654 filed Apr. 9, 1993, it was contemplated that there be provided an adjustable, preset, threaded and torqued pedal rod assembled to a mean dimension supplied by the customer and then securely locked into firm assembly for utilization without further adjustment in the assembly line of the customer.

SUMMARY OF THE INVENTION

In accordance with the principles of the invention, it is contemplated that there be provided a two piece pedal rod which is strong and efficient and which can be quickly and conveniently manufactured with great economy, thereby providing a pedal rod unit which is price competitive and entirely reliable for its intended purpose.

The two separate pieces are a head part and a shaft part which are formed without any threads or screw thread segments whatsoever. Moreover, the head part may be made of a different material than the shaft part, thereby affording the possibility of selectively and independently plating or coating one or the other of the component elements of the pedal rod assembly, thereby to protectably enhance the resistance of the part to environmental factors such as rust and corrosion by road chemicals. Such coating or plating can also effect color coding. For example, by so treating the head part selectively with a colored plating operation the parts of different original equipment manufacturers may be distinguished from one another, even though the parts are produced on the same production line. Such optional plating operation can be effected without the risk of adversely affecting the assembly joints on the other part.

The two separate parts are permanently bonded into firm assembly with one another simply by press fitting and are locked together permanently by pressure crimping, thereby to provide a crimped joint having as many as six separate crimping elements.

DESCRIPTION OF THE DRAWINGS

FIG. 1 is a perspective view of a pedal rod unit constructed in accordance with the principles of the present invention.

FIG. 2 is an elevational view showing a side elevation of the shaft part of the present invention, but with parts broken away and with parts shown in cross-section to illustrate additional details of the features incorporated in the shaft part.

FIG. 3 is an elevational view showing in side elevation the head part of the present invention prior to its joinder in assembly with the shaft part.

FIG. 4 is a cross-sectional view taken on line IV—IV of FIG. 3 and showing additional details of the head part.

FIG. 5 is a cross-sectional view taken on line V—V of FIG. 3 and showing still additional structural features of the head part.

FIG. 6 is an enlarged fragmentary cross-sectional view showing the crimped joint after assembly of the two parts and the crimped joinder thereof.

FIG. 7 is a cross-sectional view taken on line VII—VII of FIG. 6.

FIG. 8 is an enlarged fragmentary cross-sectional view taken on line VIII—VIII of FIG. 3.

DESCRIPTION OF THE PREFERRED EMBODIMENTS

This application is a continuation-in-part of my co-pending application Ser. No. 08/045,654 filed Apr. 9, 1993 entitled "Adjustable Pedal Rod and Method of Making Same."

It is believed that the method technology of the present invention and the preferred sequencing of the manufacturing techniques will be understood from the description which follows.

A metal bar stock can be employed to provide both of the two separate components, or two elements, of the pedal rod provided in accordance with this invention.

Thus, in the practice of the present invention, it is my objective to provide a pedal rod such as that illustrated in FIG. 1 and identified generally at 10. The pedal rod 10 consists of two separate elements or parts constituting a rod or shaft part 11 and a head part 12.

The head part 12 is a flat rolled steel exhibiting the characteristics 1010 to 1020, or 8620 steel. This material is particularly suitable for conducting automated punch press operations and I have found it to be particularly appropriate for use in making the head parts in accordance with the principles of the present invention. It should be understood of course, that persons of skill in the art might select a material of a different formulation which would not be a departure from the spirit of this invention. However, the specified material is designated as constituting the best mode of my discovery.

For the rod or shaft elements in the performance environment of an automotive braking assembly, I have selected material of Rockwell "B" 95-105 12L14 steel. That material I have found to be particularly appropriate for machining and stamping operations, especially when such operations are conducted on automated machinery as is generally contemplated in prescribing modern low cost manufacturing techniques.

Referring now to FIG. 2, the rod or shaft part is formed by machining a rod-shaped cylindrical work piece into an elongated cylindrically shaped body having a ball 13 at its free end, adapted to cooperate with the mechanism with which the pedal rod is associated. Extending axially away from the ball 13 is a reduced diameter shaft portion 14 which merges with a transition stage formed as an outwardly tapered section 15 and expanding to a larger diameter body portion which is of uniform diametral size throughout its length as shown at 16 and extending to the end of the work piece. The body portion 16 terminates in an end wall 17 which is disposed to extend radially.

As is disclosed in one of my earlier applications, it is contemplated that there be formed by a stamping step a spring seating shoulder 18, the formation of which is quickly and conveniently afforded by displacing the metal of the surface so that a plurality of projections form a seating shoulder extending radially outwardly of the body portion 16.

It will be appreciated that the only machining step required to finish the rod or shaft element 11 is form the ball 13 and its related transition portions and a seating recess 19 in the end wall 17 of the rod or shaft element 11. The step of forming recess 19 is accomplished by drilling and reaming the recess, for example, on a multiple spindle screw machine, which may also be used to form the ball 13. The recess 19 is essentially cylindrical in shape and extends inwardly of the end wall 17 on a center line axis of the rod or shaft part 11.

Turning now to FIGS. 3, 4 and 5, it will be noted that the head part 12 can be formed in a punch press operation simply by punching in a single stroke the configuration shown in FIG. 3, namely, by providing a main body portion 20 having a through opening 21 centrally disposed therein. A curved outer edge is shown at 22 disposed approximately in concentric spacing relative to the opening 21 and terminating in spaced parallel side walls 23 and 24.

The side walls 23 and 24 terminate in a flat planar end wall 25 from which projects at a central axial position a generally rectangular boss 26 having a rounded pilot end 27. The opposite sides of the boss 26 are notched as at 28 and 29, to provide a relief space in which crimped material may be displaced during a subsequent assembly operation. It should be understood that the boss 26 is sized and shaped so that it can be received within the recess 19. It is not cylindrical. Rather, it is essentially rectangular in cross-section. However, it can be fitted within the recess 19 for the purposes which will be described in greater detail.

It will be appreciated that the rod or shaft element 11 and the head part or element 12 constitute first and second parts which may be axially advanced selectively to successively engage the boss 26 into the recess 19, thereby to accomplish assembly of the two parts. This assembly can be accomplished mechanically and could be automated if so desired.

However, one of the features of the present invention is that the two different parts afford a technique of manufacture which enables selective color coding or plating to be accomplished without adversely affecting the integrity of the assembled parts.

For example, some automobile manufacturers desire to afford parts which are exposed to corrosion of road chemicals such as salt and other ice melting compounds with special protection. Such manufacturers require that the head part of the pedal rod assembly, especially, be plated or protectively coated, since it is the head part that projects outside of the protective assembly.

Since the head part 12 of the present invention is made as a completely separated part, and is even made of a material which is different than the material or stock from which the rod or shaft part 11 is made, it is possible to afford the original equipment manufacturer a plating or color coding option at a nominal cost, since the head parts can be separately plated, without any adverse effect on the structural and functional characteristics of the rod or shaft element, and without adding any cost to the manufacturing price of the rod or shaft element.

For example, the head parts are at this stage subjected to a yellow die chromate plating procedure so that they will not only be protectively plated with a plated coating and given an increased protection against the potentially harmful effects of a tough operating environment but will also be very distinctively colored, thereby serving to clearly and unmistakably identify the particular pedal rod of which the plated head element is a part as that of a specific customer. Such plated coating is depicted in the drawings in the enlarged fragmentary cross-section of FIG. 8.

As disclosed in my parent application pedal rods are operatively connected in the actuating train of a motion mechanism actuated by the operator of a vehicle. The head shown at 12 is illustrated in a single bar form, although those versed in the art will readily recognize that the head 12 could also take the form of a clevis, a form of pedal rod configuration often used by foreign manufacturers of motor vehicles, or a so-called offset head, which some OEM automobile manufacturers prefer for space accommodation reasons.

In any event, once the head part 12 is ready for assembly to the rod or shaft part 11, the boss 26 is inserted into the recess 19. In this regard, the rounded end shown at 27 on the end of the boss 26 eases entry of the generally rectangularly shaped boss into the cylindrically shaped recess and facilitates the assembly, particularly if such assembly operation is being effected by automated machinery.

As will be evident from an inspection of FIGS. 6 and 7, the two parts are press fit together so that the end wall 17 of the part 11 seats snugly up against the wall 25 of the part 12 and the boss 26 extends fully and completely into the recess 19.

At this juncture, the first and second parts may be permanently bonded and assembled together by pressure crimping at as many as six separate locations. Thus in FIGS. 6 and 7, four circumferentially spaced crimps 30 are shown, each of which constitutes an axially extending elongated slot which displaces material inwardly from the outer part 11 into a bonding relation with the inwardly adjacent part 12. Since the assembly of the first and second parts relates the body portion of the rod or shaft part as an outer part surrounding an inner part provided by the boss of the second part, it should be noted how the material from the body portion 16, or outer part, is actually displaced radially inwardly into the notches 28 and 29 formed in the surface of the boss 26, or inner part. Further, the other two crimps displace material from the body portion 16 into close bonding relation with the surfaces of the boss 26, thereby placing the two parts in firm assembly with one another. To further insure good bonding, two additional spaced end crimps as shown at 31 may also be employed. The crimps 31 are disposed on diametrically opposite sides of the body 16 right at the end wall 17.

In effect, the crimped joint forms and functions as locking means which operate to bond the inner and outer parts into an integrated unitary assembly so that the two parts constitute a single pedal rod unit exhibiting unusual strength and versatility, but capable of being produced on modern machinery at reduced cost.

Although various minor modifications might be suggested by those skilled in the art, it should be understood that I wish to embody within the scope of the patent warranted hereon all such modifications as reasonably and properly come within the scope of my contribution to the art.

I claim as my invention:

1. A pedal rod assembly made of a two part subassembly, and comprising, in combination,
   (a) a first metal part constituting a rod shaped and formed to define an elongated cylinder shaped rod having a ball at one end, a reduced diameter portion extending axially away from said ball, a tapered outwardly expanding transition portion, and a body portion extending axially therefrom and being of a uniform diameter throughout and terminating in a radially disposed end wall,
      said end wall having a nonthreaded recess formed therein,
   (b) a second metal part constituting a flat head part shaped and formed to define a body portion having a through opening extending therethrough and having an axially extending nonthreaded boss projecting from one end wall thereof which is sized and shaped to be complementarily received within said recess in said first part,
   (c) a crimped joint formed between the first and second parts after the boss of said second pan is inserted into the recess of the first pan and said end wall of said first part is seated against the end wall of the second part,
      said crimped joint comprising interfitted bonded together locking means formed by the displaced material projecting inwardly from the outer first pan into and against the adjoining recessed surfaces of the inner second part,
   whereby the first and second parts are united into an integral unitary pedal rod.

2. A pedal rod assembly made of a two part subassembly, and comprising, in combination,
   (a) a first part constituting a rod shaped and formed to define an elongated cylinder shaped rod having a ball at one end a reduced diameter portion extending axially away from said ball, a tapered outwardly expanding transition portion, and a body portion extending axially therefrom and being of a uniform diameter throughout and terminating in a radially disposed end wall,
      said end wall having a recess formed therein,
   (b) a second part constituting a flat head part shaped and formed to define a body portion having a through opening extending therethrough and having an axially extending boss projecting from one end wall thereof which is sized and shaped to be complementarily received within said recess in said first part,
   (c) a crimped joint formed between the first and second parts after the boss of said second part is inserted into the recess of the first part and said end wall of the second part,
      said crimped joint comprising interfitted bonded together locking means formed by displaced material projecting inwardly from the outer first part into and against the adjoining recessed surfaces of the inner second part,
   whereby the first and second pans are united into an integral unitary pedal rod, said second pan having formed thereon a plated coating of protective material to enhance resistance of said second part to adverse environmental factors.

3. A pedal rod as defined in claim 2 wherein said first part is made of 12L14 steel material.

4. A pedal rod as defined in claim 2 wherein said second part is made of 1010-1020 flat rolled steel for effecting formation of said second part in a single stroke punching operation.

5. A pedal rod as defined in claim 2 wherein said plated coating is formed of a yellow die chromate.

6. A pedal rod as defined in claim 2 wherein the crimped joint comprises six separate crimps:
   (a) four in circumferentially spaced portions of the peripheral surface of the body portion of the first part inwardly adjacent the end wall of the first part, and
   (b) two in diametrically opposite sides of said first part at the end wall thereof.

7. A pedal rod comprising in combination,
   a metal rod part having a ball at one end and an elongated cylindrically shaped body portion terminating in a radial end wall,
      said body portion having an axially inwardly extending nonthreaded cylindrical recess formed in said radial end wall,
   a metal head part having an end wall and a projecting nonthreaded cylindrical boss extending from said end wall and complemental in diameter and length to said cylindrical recess for insertion in to the recess in said radial end wall,
      said head part having said boss inserted into said rod pan at said recess, thereby to form a subassembly wherein the rod pan is a first outer part and the head part is a second inner part, and
   a crimped joint between the inner and outer parts and comprising fitted together locking means bonding the rod part and the head pan into a unitary integrated unit pedal rod.

* * * * *